US005625799A

United States Patent [19]
Radko

[11] Patent Number: 5,625,799
[45] Date of Patent: Apr. 29, 1997

[54] METHOD AND APPARATUS FOR DETERMINING THE LOGIC AND FUNCTIONALITY OF A CHANGELINE

[75] Inventor: Ron Radko, Bellevue, Wash.

[73] Assignee: Microsoft Corporation, Redmond, Wash.

[21] Appl. No.: 268,015

[22] Filed: Jun. 29, 1994

[51] Int. Cl.$^6$ .......................... G06F 13/12; G06F 9/445; G11B 19/10
[52] U.S. Cl. ..................... 395/500; 395/894; 360/69
[58] Field of Search ........................... 395/500, 894, 395/282; 360/69

[56] References Cited

U.S. PATENT DOCUMENTS

| | | | |
|---|---|---|---|
| 5,173,816 | 12/1992 | Ogihara | 360/69 |
| 5,293,625 | 3/1994 | Miura et al. | 395/500 |
| 5,301,293 | 4/1994 | Kano | 395/425 |

OTHER PUBLICATIONS

*IBM Technical Reference, Pesonal Computer AT* Systems BIOS 5, ROM BIOS Code Listing for Floppy Controller, IBM, 1985, pp. 97–115.

*Primary Examiner*—Larry D. Donaghue
*Assistant Examiner*—Mark H. Rinehart
*Attorney, Agent, or Firm*—Seed and Berry LLP

[57] ABSTRACT

A method and apparatus for determining the logic and functionality of a disk changeline. By attempting to reset the changeline and monitoring the changeline for a change in state, the present invention determines whether a changeline is functional. When the present invention does not immediately observe a change in state, the present invention accesses the disk drive to determine whether a disk is present in the drive. When a disk is present in the drive, the present invention reads the changeline and stores the read value as a disk present value. When the present invention has previously determined that the changeline is functional, the present invention inverts the disk present value to create a disk not present value. When a disk is not present in the disk drive, the present invention stores the read value of the changeline as the disk not present value. Having obtained a disk not present value, the present invention compares the obtained value with a known active changeline state of a machine using an inverted logic. When the disk not present value is not equivalent to the active changeline value of the inverted logic machine, the present invention determines that the changeline employs normal logic and is functional. On the other hand, when the disk not present value is equivalent to the active value of the inverted logic machine, the present invention compares the floppy disk not present value with the floppy disk present value. When the floppy disk not present value is equivalent to the floppy disk present value, the present invention determines that the changeline is not functional. Conversely, when the floppy disk not present value is not equivalent to the floppy disk present value, the present invention determines that the changeline employs inverted logic and is functional.

21 Claims, 7 Drawing Sheets

METHOD AND APPARATUS FOR DETERMINING THE LOGIC AND FUNCTIONALITY OF A CHANGELINE

TECHNICAL FIELD

The present invention relates to the field of computer systems, and more particularly, to a method and apparatus which determines whether a changeline is functional and whether the changeline uses normal or inverted logic.

BACKGROUND OF THE INVENTION

In personal computer systems, floppy disks provide an inexpensive and easily portable storage medium. In brief, floppy disks allow a user of a computer system to store and recall data (e.g., application programs and associated files) as needed. More specifically, when a user desires to store or recall a particular piece of data to/from a floppy disk, the user simply inserts the desired disk into a floppy disk drive of a personal computer system and invokes a command from an application program (e.g., a save file command). As floppy disks are frequently swapped in and out of the floppy disk drive, personal computer systems use a changeline signal ("changeline") to inform the application program of the possibility that the media contained in the disk drive has changed since the last time the application pro,am accessed the disk contained in the drive. The term "media" refers to physical material (e.g., a disk) that is used for storing information in a computer system. Similarly, the phrase "media uncertain" indicates that the media contained in the drive may have changed since the last access to the floppy disk drive. As will be explained in detail below, a functioning changeline indicates that the media contained in the drive is uncertain.

The floppy disk drive has a floppy disk door which must be opened to insert or remove a disk from the floppy disk drive. The changeline is a hardware signal which is tied to this floppy disk door. When functional, the changeline has an active state and an inactive state. The active state indicates that the floppy disk drive door has been opened since the last time that the floppy disk drive was accessed. Conversely, the inactive state indicates that the floppy disk drive door has not been opened since the last time that the floppy disk drive was accessed. An application program or a device driver can read the state of the changeline through a function provided by a floppy disk controller. A floppy disk controller is a device that serves as an interface between the physical components of the floppy disk drive and software programs (e.g., an application program or device drive). By reading the changeline via the controller, a software program can determine whether the floppy disk drive door has been open since the last disk access. However, as the value of the changeline merely indicates whether the drive door has been opened, the changeline does not inform the software program driver of whether a floppy disk is or is not present in the floppy disk drive. Instead, an active changeline value merely indicates that the user has either (1) inserted a new disk into the floppy disk drive since the last access, (2) removed the floppy disk from the floppy disk drive, or (3) opened and closed the drive door without removing the floppy disk. Still, assuming that the changeline is properly functioning, the changeline is a valuable tool in determining whether the disk drive likely contains the media that the application program or device driver expects to find in the disk drive. This is because an inactive changeline indicates that the media that is currently present in the drive is the same media that was present at the time of the last floppy disk access.

The usefulness of the changeline is limited, however, because it is prone to breakage. In brief, the changeline is prone to breakage because it is a mechanical switch tied either to a logical high or a logical low voltage. This mechanical switch is toggled every time that the floppy disk drive door is opened (i.e., every time that a user inserts or removes a floppy disk to/from the floppy disk drive). As with all mechanical switches, the mechanical switch of the changeline has a limited life span due to component fatigue (e.g., metal fatigue). When the mechanical switch of the changeline breaks, the value of the changeline defaults to the inactive changeline status. Thus, a broken changeline always indicates that the disk door has not been opened since the last disk access. Under these conditions, the software program may attempt to access a disk that is not actually present in the drive. When this occurs the floppy disk controller strives to satisfy the disk access request but cannot as here is no media in the drive. After a predetermined amount of time the floppy disk controller recognizes that the access request is futile and informs the software program that the disk access request has failed. This type of failure is known as a time-out failure or simply a time-out. However, the predetermined time required for the time-out to occur is fairly long (e.g., approximately five to six seconds) and is frustrating to the user.

The usefulness of the changeline is further limited because an industry standard for an active value of the changeline does not exist. While the majority of computer systems use a high-active changeline value, some computer systems use a low-active changeline value. The discussion incorporated within refers to systems using a high-active (digital level 1) changeline value as systems using a normal logic, and refers to systems using a low-active (digital level 0) changeline value as systems using an inverted logic. The active, inactive, and broken states for the normal logic and the inverted logic are summarized in Table 1.

TABLE 1

|  | CHANGELINE ACTIVE (DRIVE DOOR HAS BEEN OPENED SINCE LAST ACCESS) | CHANGELINE INACTIVE (DRIVE DOOR NOT OPENED SINCE LAST ACCESS) | BROKEN CHANGE- LINE |
|---|---|---|---|
| Normal Logic | 1 | 0 | 0 |
| Inverted Logic | 0 | 1 | 1 |

Due to the fact that some computer manufacturers utilize the inverted logic for their changelines, a software program cannot, merely by reading a changeline value, determine the meaning of the read value. Instead, it is first necessary to determine which type of logic is employed by the computer system. In conventional systems, however, such determination is an arduous task. More specifically, conventional methods for determining whether a given computer system utilizes the normal logic or the inverted logic require the maintenance of a database. For example, International Business Machines, Incorporated (IBM™) produces a popular line of computers known as the PS/2™. Within this line of computers, IBM™ produces some machines which employ the normal logic for the changeline and produces other machines which employ the inverted logic for the changeline. In order for a software program to determine whether the machine in question uses the normal or the inverted logic, it is necessary for the software program to maintain a database of PS/2 serial numbers for the machines that use the inverted logic. In brief, the software program calls a function provided by the PS/2 system to return the serial number of the machine that the software program is operating. The software program then compares the serial number with those contained within the database. If the serial number matches one of the database serial numbers, the software program knows that it is operating on a machine which employs the inverted logic for the changeline. This method for determining whether a computer system utilizes normal or inverted logic is undesirable as maintaining the database is labor intensive. This method is also undesirable because it forces software developers to rely on hardware manufacturers to accurately supply the needed serial numbers. Reliance on hardware manufacturers is not desirable as they may supply incorrect serial numbers or may refuse to supply any serial number at all. As a result, the software program may erroneously identify, an inverted logic changeline as a normal logic changeline. When this occurs, the software program will incur the above-described lengthy time-out failures.

SUMMARY OF THE INVENTION

The present invention is directed to a facility, for determining the logic and functionality, of a disk changeline. The facility, after taking a first reading of the changeline, attempts to place the changeline in an inactive state. The facility, then monitors the changeline for a change between an active state and an inactive state. When the facility observes a change in state, the facility knows that the changeline is functional. The facility, also accesses the disk drive to determine whether a disk is present in the drive. By loading a time-out counter prior to accessing the disk drive, the facility determines the presence or absence of a disk much faster than the time-out process of conventional systems. Upon determining whether a disk is present Ln the drive, the facility, reads the value of the changeline. When a disk is present in the drive, and after attempting to set the changeline in its inactive state, the facility stores the read changeline value as a disk present value. Additionally, when the facility, has previously determined that the changeline is functional, the facility, inverts the disk present value to create a disk not present value. Similarly, when a disk is not present in the disk drive, the facility stores the read value of the changeline as the disk not present value. Having obtained a disk not present value, the facility compares the obtained value with a known active changeline value of a machine using an inverted logic. When the disk not present value is not equivalent to the active changeline value of the inverted logic machine, the facility, knows that the changeline employs the normal logic and is functional. On the other hand, when the disk not present value is equivalent to the active value of the inverted logic machine, the facility compares the floppy disk not present value with the floppy disk present value. When the floppy disk not present value is equivalent to the floppy disk present value, the facility knows that the changeline is not functional. In contrast, when the floppy disk not present value is not equivalent to the floppy disk present value, the facility, determines that the changeline employs inverted logic and is functional.

By determining the logic and the functionality of a changeline in this manner, the present invention vastly improves the state of art. For example, unlike conventional systems, the present invention does not mistakenly access the drive when media is not present in the drive. More specifically, the present invention avoids these mistaken accesses by not relying on the changeline values unless the changeline's logic and functionality have been determined. For cases where the present invention has determined that the changeline is not functional, the present invention determines the status of the media using the previously-described process of loading the time-out counter and accessing the disk drive. In this manner, the present invention determines the presence or absence of the disk while avoiding the long time-out failures that plagued the prior art. Similarly, by identifying the logic of the changeline prior to relying on it, the present invention does not incur long time-outs conventional systems incur when they incorrectly identify an active changeline value as an inactive changeline value. Moreover, as the present invention determines the logic of the changeline without maintaining a database, the present invention provides a facility which is not labor intensive nor reliant on hardware manufacturers. As a result, the present invention provides a robust and efficient facility, for determining the logic and functionality of a changeline.

After determining that the changeline is functional, the present invention evaluates the state of the changeline to determine the status of the media in the disk drive. More specifically, when the present invention reads an active changeline reading after attempting to reset an active changeline, the present invention determines that no media is present in the drive. Additionally, when the present invention reads an inactive changeline after reading, and attempting to reset an active changeline, the present invention determines that media is present in the drive, but that the media has changed since the time of the last drive access. Alternatively, when the present invention reads two consecutive inactive changeline values, the present invention determines that media is present in the drive and that this media is the same media that was present at the time of the last drive access. In the above-described manner, the present invention quickly determines the media status of the drive regardless of the logic and/or functionality, of the changeline.

DETAILED DESCRIPTION OF THE INVENTION

The present invention is directed towards a method and apparatus for determining the logic and functionality, of a changeline. In its preferred embodiment, the present invention is contained within a floppy disk driver. The system takes an initial reading of the changeline immediately after a graphical user interface program (e.g., Windows® by Microsoft®) is invoked. Typically, this graphical user interface program will be invoked immediately following the booting of the computer system (system boot). In such a case, the changeline is, by convention, in its active state. Also, by convention, an active changeline can only be reset when media is present in the drive (i.e., an attempt to reset the changeline when media is not present in the drive will not be successful). Thus, for the case where the graphical user interface program is invoked immediately following system boot and without media in the drive, the present invention can quickly determine the functionality changeline by taking a second reading of the changeline after attempting to reset the changeline. More specifically, the system can determine whether the changeline is functional by comparing the initial reading with the second reading. Regardless of whether the system has, at this early stage, determined that the changeline is functional, the system accesses the disk drive to determine whether a disk is present in the drive. Upon determining whether a disk is present in the drive, the present invention takes a third reading of the changeline. As will be described in detail below, by evaluating this third read value in light of (1) known states for functional changelines, and/or (2) whether the present invention has determined that the changeline in question is functional, the present invention quickly and reliably determines the logic and functionality of a particular changeline. More specifically, (1) when a disk is not present in the disk drive and (2) when the third read value equals the active state of a normal logic changeline, the present invention determines that the changeline is functional and uses the normal logic. Additionally, when the present invention knows that the changeline is functional, the present invention determines the changeline's logic by comparing the third read value with a known expected value. For example, when the third read value is taken when a disk is in the drive the present invention can determine the changeline's logic by comparing the third read value to either an inverted inactive changeline value or a normal inactive changeline value (e.g., when the changeline in question uses the inverted logic, the third read value will be equal to the inverted inactive changeline value). Also, when the present invention has not determined the functionality of the changeline after taking the third read value the present invention postpones relying on changeline values until it has read the changeline (1) when a disk is not present in the drive and (2) when a disk is present in the drive. When these two changeline values are equal, the present invention knows that the changeline is not functional. On the other hand, when these two values are not equivalent, the present invention knows that the changeline is functional and determines the changeline's logic by comparing one of the values to a known expected value. By not relying on changeline values until the logic and/or functionality, of the changeline is determined in the above-described manner, the present invention not only avoids the previously mentioned prolonged time-outs, but also determines the logic employed by the changeline without maintaining a database.

Figure 1:
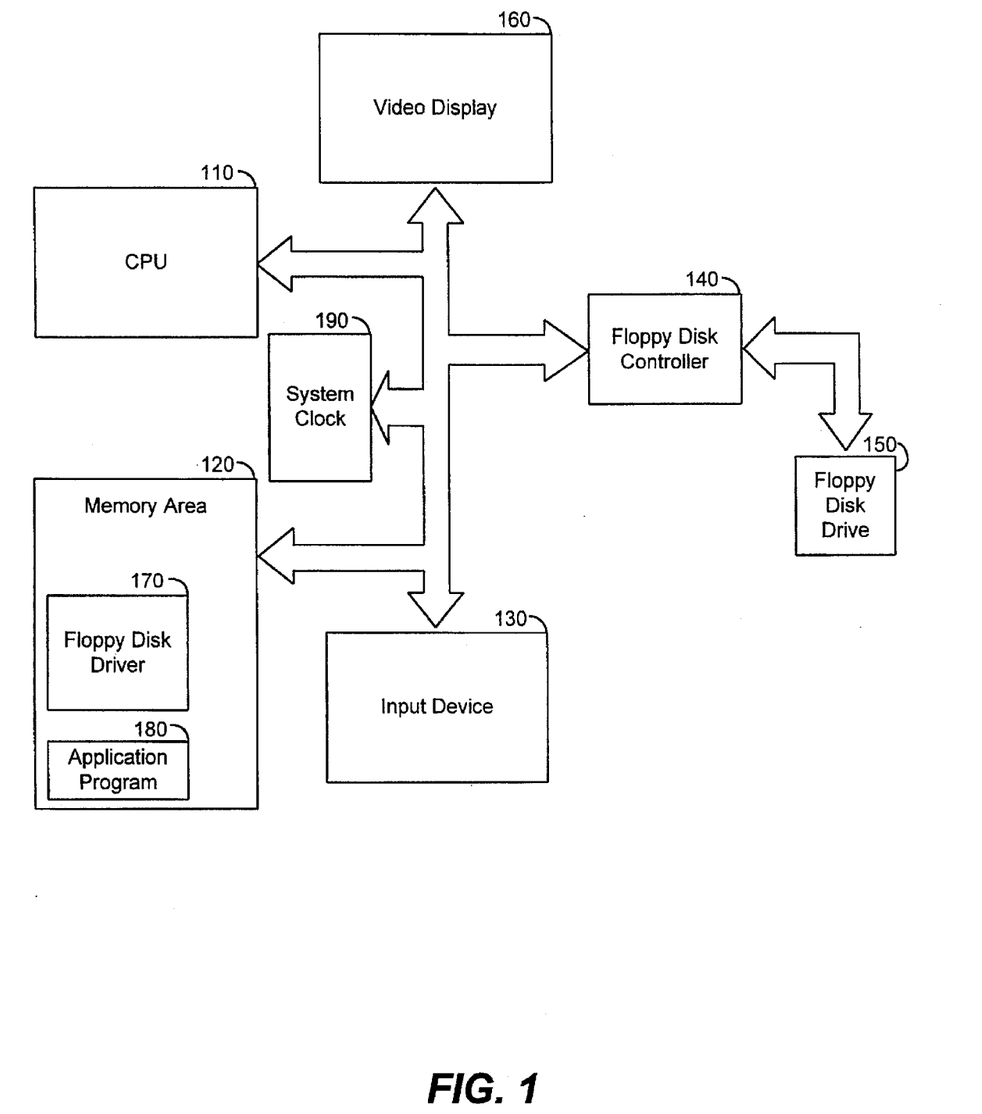
FIG. 1 illustrates a personal computer system for practicing the preferred embodiment of the present invention.

FIG. 1 illustrates a personal computer system for practicing the preferred embodiment of the present invention. This computer system features a central processing unit 110, a memory, area 120, an input device 130, a floppy disk controller 140, a floppy disk drive 150, a video display 160, and a system clock 190. These components are interconnected as shown. Additionally, the memory area 120 contains a floppy disk driver 170 and an application program 180. The processing steps explained below with reference to FIGS. 2–6 are performed by the floppy disk driver 170. However, those skilled in the art will appreciate that these processing steps could be performed by other entities (e.g., by an application program) without departing from the spirit and the scope of the claimed invention.

In its current form, the present invention is incorporated into a portion of the driver 170 that is responsible for determining whether the drive currently contains media. More specifically, the present invention is currently embodied as the portion of the driver which is responsible for informing a file system of disk drive's media status (i.e., whether a media is present or is not present in the drive or whether a media is present, but that the media has changed since the last time the file system accessed the drive). In brief, the file system is a software component which determines whether to retrieve requested disk data from a disk cache or from the actual floppy disk itself. As is well known to those skilled in the art, a disk cache is a portion of the computer system's memory which stores recently requested disk data (i.e., data that has recently been read from, or written to, the disk). The file system is not described in detail herein as it does not comprise a limitation of the present invention. For purposes of the accompanying discussion, the file system may be thought of as a component which (1) receives media status information from the present invention, and (2) uses this information to determine whether the disk cache can be used to transfer data between the computer system's memory, and the floppy disk. As will be explained in detail below, during the process of determining the status of the media, the present invention gathers information to determine the logic and functionality, of the changeline.

Figure 2:
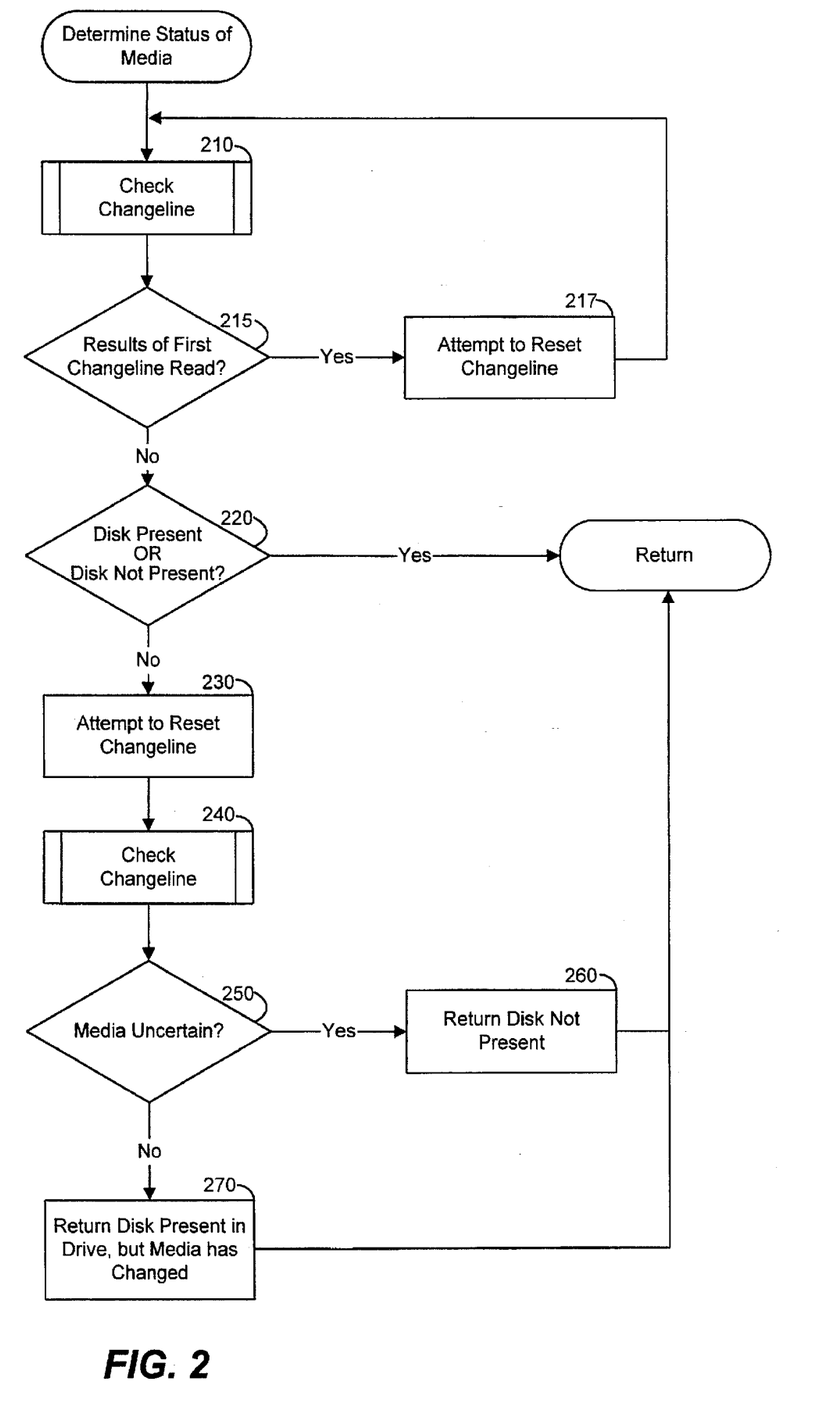
FIG. 2 is a flow diagram of the steps of the preferred embodiment of the present invention for determining whether a floppy disk is in a floppy disk drive.

The present invention begins its processing with the Determine Status of Media Routine of FIG. 2. The Determine Status of Media Routine returns one of three indicators: (1) a disk present indicator, (2) a disk not present indicator, or (3) a disk present-media has changed indicator. As its name implies, the disk present indicator indicates that media is present in the drive. Additionally, after the present invention has determined the logic and functionality, of the changeline, the disk present indicator further indicates the media in the drive has not changed since the last time that the drive was accessed. Similarly, the disk not present indicator indicates that the drive does not currently contain media. The disk present-media has changed indicator indicates that the drive contains media, but that the media may have changed since the last disk access. Thus, the disk present-media has changed indicator informs the file system that it cannot use the disk cache to transfer data between the floppy disk and the memory area. In the preferred embodiment, the Determine Status of Media Routine is invoked each time that the previously mentioned graphical user interface program is launched. However, those skilled in the art will appreciate that the embodiment described below could be easily modified to invoke the Determine Status of Media Routine at any time (e.g., to allow an application program to periodically call the routine in order to ensure that the changeline has not broken since an initial determination of validity). The routine begins by calling the Check Changeline Routine of FIG. 3A (step 210).

Figure 3A:
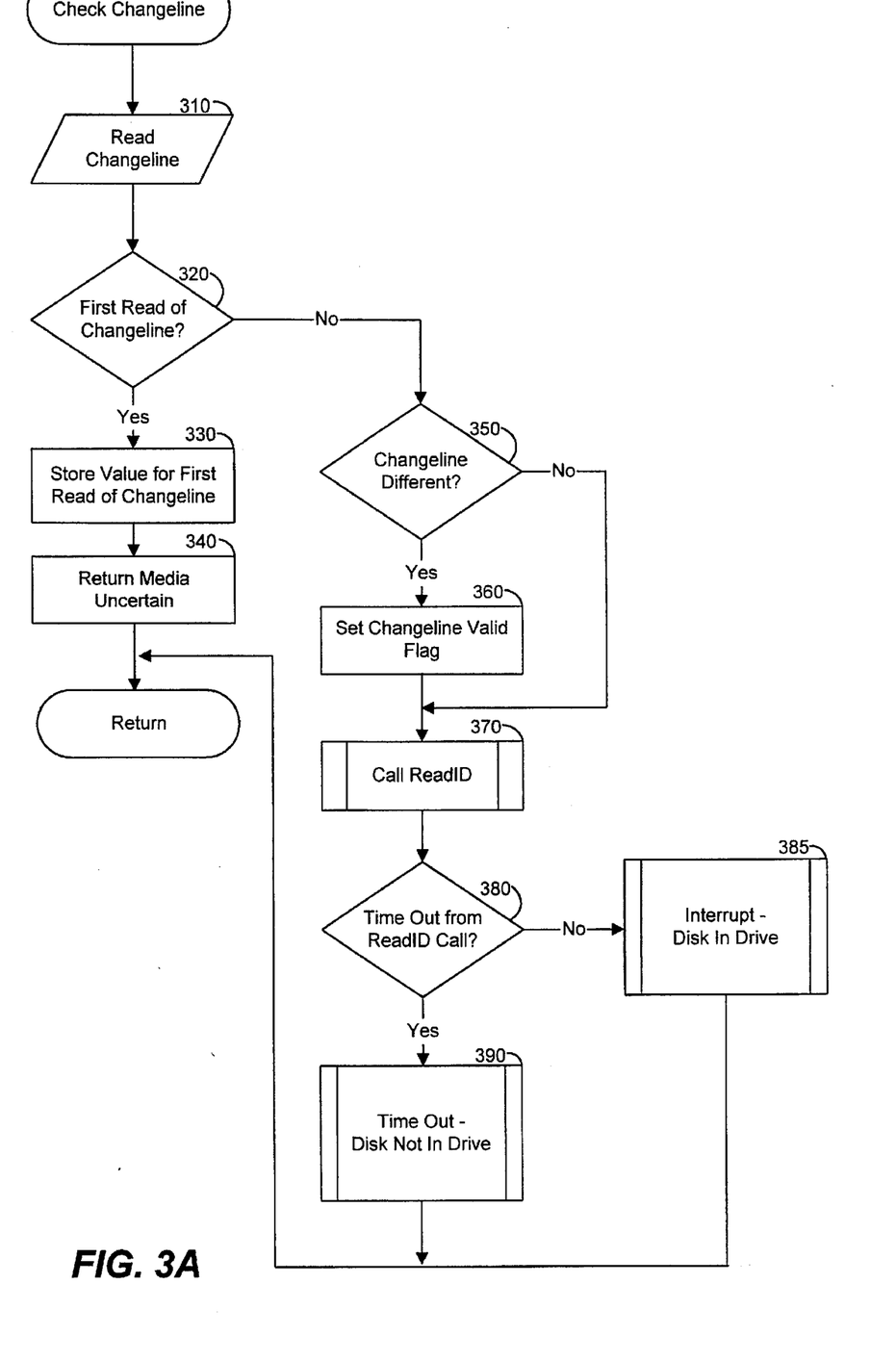
FIG. 3A is a flow diagram of the processing steps of the preferred embodiment of the present invention for determining the logic and functionality, of a changeline.
Figure 3B:
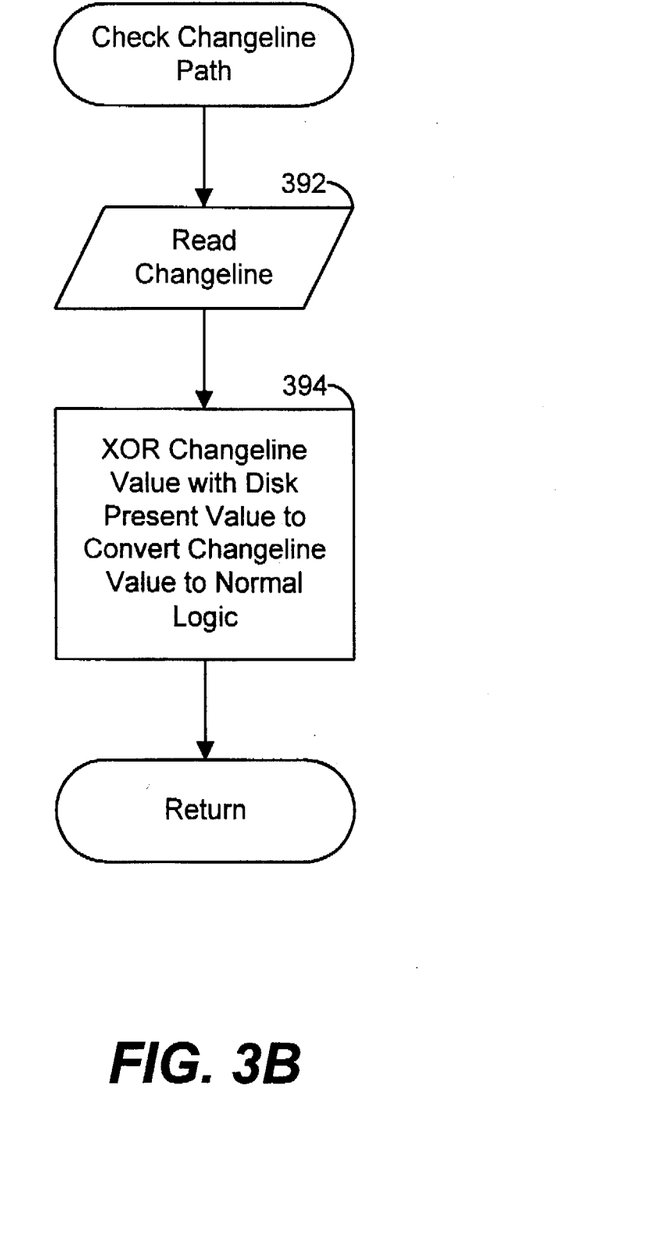
FIG. 3B is a flow diagram of the processing steps of the preferred embodiment of the present invention for converting read changeline values of a functional changeline to normal logic values.

A purpose of the Check Changeline Routine is to determine the logic and functionality, of the changeline. The Check Changeline begins by reading the current value of the changeline (step 310). In brief, the driver 170 reads the value of the changeline by reading a port of the floppy disk controller. By convention this port of the floppy disk controller is a dedicated location in memory for passing data (i.e., changeline values) between the floppy disk controller and the floppy disk driver. Having read the changeline, the driver determines whether this is the first time that the driver has read the changeline since entry to the Determine Status of Media Routine (step 320). When this is the first read of the changeline, the driver stores the read value, indicates that the media contained within the disk drive is uncertain and returns to the Determine Status of Media Routine (steps 330 and 340).

Upon return to the Determine Status of Media Routine, the driver 170 determines that the Check Changeline Routine has taken the first reading of the changeline since the launching of the graphical user interface program (step 215). Consequently, the driver attempts to reset the changeline (step 217). The actual steps for resetting the changeline do not impose a limitation on the present invention. However, for completeness of discussion, a possible series of these steps for resetting the changeline are provided here. The preferred embodiment attempts to reset the changeline by resetting the floppy disk controller and programming the floppy disk controller to seek track one of the floppy disk and then to seek track zero of the floppy disk. In brief, a track is a logically formatted area of the floppy disk and the term "seek" refers to the process of moving a read/write head of the floppy disk controller to a desired location (i.e., to track 0 or track 1). After receiving the above-described sequence of commands, the floppy disk controller will reset the changeline when there is media present in the drive. As mentioned above, the Determine Status of Media Routine is invoked immediately after launching a graphical user interface program. Moreover, in most instances, the graphical user interface program is launched immediately following system boot. As discussed above, booting a computer system places a functional changeline in its active state. Consequently, the first reading of the changeline will, in most instances, be the active value of the changeline. As a result, when media is present in the drive, the attempt to reset the changeline typically toggles the value of the changeline from the active state to the inactive state. After attempting to reset the changeline, the device driver recalls the Check Changeline Routine of FIG. 3A (step 210).

Upon re-entry to the Check Changeline Routine, the driver 170 again reads the changeline (step 310). After recognizing that this is not the first reading of the changeline, the driver compares the first reading with the current reading to discern whether they are different (steps 320 and 350). When the readings of the changeline are different, the driver recognizes that the changeline is functional and sets the Changeline Valid Flag (step 360). Regardless of whether the driver has determined that the changeline is valid at this stage, the driver issues a disk access request to determine whether the drive contains media (step 370). By issuing this disk access request, the driver gains additional information concerning the logic and functionality, of the changeline. More specifically, when the drive does not contain media, a functioning changeline will be in the active state to indicate that the drive door has opened since the last disk access (e.g., that the drive door has been opened to remove the media or that the drive has not contained media since the system boot). Conversely, when the drive does contain media, a functioning changeline will be in its inactive state as the present invention previously attempted to reset the changeline (see step 217).

In the preferred embodiment, the driver 170 issues a ReadID call to access the disk drive (step 370). This ReadID call references a ReadID function in the floppy disk controller. In brief, this function returns positioning information to the driver. The precise data returned from the ReadID function is not material to the present invention as the present invention does not utilize the ReadID function in its desired manner. Instead, the driver uses the ReadID function to quickly determine whether a disk is present in the drive. In order to quickly determine the disk's presence or absence, the driver, prior to issuing the ReadID call, loads a time-out counter with a predetermined value. This time-out counter is used to terminate the ReadID request when the controller does not complete the request within the predetermined amount of time. More specifically, the time-out counter is decremented with each cycle of the system clock 190. When the counter is decremented to zero before the controller completes the processing of the ReadID function, the driver automatically recaptures processing control. By loading a time-out counter in this fashion, the preferred embodiment determines the presence or absence of a disk much faster than the time-out process of conventional systems. More specifically, the preferred embodiment loads the time-out counter so that the driver will automatically recapture processing control when the controller cannot access media within 0.4 second. As explained above, conventional systems require as much as six seconds to return to a software program when the soft are program attempts to access the floppy disk drive when media is not present in the drive. Consequently, the present invention greatly reduces the amount of processing time overhead relative to that which exists in conventional systems. On the other hand, when the ReadID request does not time-out, the driver regains processing control via an interrupt. This interrupt is a signal generated by the controller which informs the central processing unit that the controller has completed the disk access request. In turn, the central processing unit relays the interrupt to the driver. This interrupt informs the driver that the controller was able to process the ReadID request, and thus signifies that a disk is present in the drive. When the driver receives an interrupt in response to the ReadID call, the driver calls the Interrupt-Disk in Drive Routine of FIG. 6 (steps 380 and 385). Conversely, when the controller does not return an interrupt within the time specified by the time-out counter, the driver calls the Time Out-Disk Not in Drive Routine of FIG. 4 (step 390).

Figure 4:
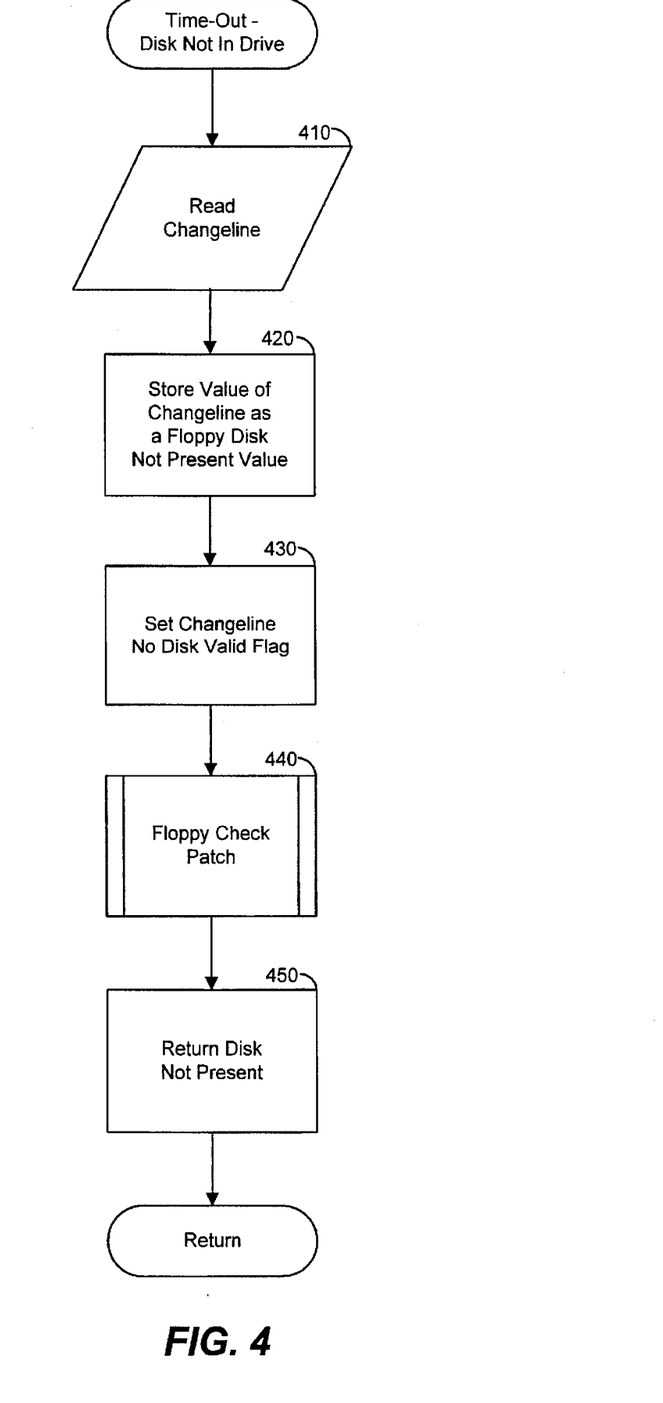
FIG. 4 is a flow diagram of the processing steps of the preferred embodiment of the present invention for determining the logic and functionality of a changeline when a floppy disk is not present in the floppy disk drive.

A purpose of the Time Out-Disk Not in Drive Routine is to determine whether the changeline employs the normal or the inverted logic, or to determine whether the changeline is broken. Also, when the present invention does not yet possess enough information to determine the logic/functionality of the changeline, the Time Out-Disk Not in Drive Routine informs the file system that a disk is contained within the floppy drive. The routine begins processing by reading the current value of the changeline (step 410). The driver then stores the changeline value as a Floppy Disk Not Present Value (step 420). As a functioning changeline will be in its active state whenever a disk is not in the drive, this Floppy Disk Present Value is, for a functioning changeline, the active value of the changeline. Additionally, the driver sets a Changeline No Disk Valid Flag to indicate that the invention has read the changeline for the case where media is not present in the disk drive (step 430). Subsequently, the Time Out-Disk Not in Drive Routine calls the Floppy Check Patch Routine of FIG. 5 (step 440 ).

A purpose of the Floppy Check Patch Routine is to determine the logic and functionality of the changeline based on stored Floppy Disk Not Present and/or stored Floppy Disk Present Values. The Floppy Check Patch Routine is called from the Time Out-Disk Not in Drive Routine of FIG. 4 and from the Interrupt-Disk in Drive Routine of FIG. 6. In this case, the Time Out-Disk Not in Drive Routine has called the Floppy Check Patch Routine. The Floppy Check Patch Routine begins processing by determining whether the Floppy Disk Not Present Value is equivalent to the active changeline state of a machine using inverted logic (step 510). When the stored Floppy Disk Not Present Value is equivalent to the active changeline state of a machine using inverted logic, the routine continues processing by examining whether the driver 170 has identified a Floppy Disk Present value (step 560). The Floppy Disk Present Value is the value of the changeline (1) when a disk is present in the drive and (2) when the present invention has previously attempted to reset changeline. Thus, for a functioning changeline, the Floppy Disk Present Value will be the inactive state of the changeline. As will be explained in detail below, the driver determines the Floppy Disk Present Value via the Interrupt-Disk in Drive Routine of FIG. 6. More specifically, the Interrupt-Disk in Drive Routine sets a Changeline Disk Present Flag to indicate that the present invention knows that the driver has determined a Floppy Disk Present Value. When the driver has not yet determined the Floppy Disk Present Value and when the Floppy Disk Not Present Value equals the active state of an inverted changeline, the routine does not possess sufficient information to determine the logic and functionality of the changeline (i.e., the changeline could be either inverted and functional or normal and broken) (step 560, NO Pathway). Conversely, when the stored Floppy Disk Not Present Value is not equivalent to the active changeline state of a machine using inverted logic, the routine does possess sufficient information to determine the logic and functionality of the changeline (step 510. NO Pathway). For purposes of example, assume that the changeline in question is a normal, functioning changeline. In this case, the Floppy Disk Not Present Value (i.e., the normal active value, see Table 1) does not equal the active value for an inverted changeline. Consequently, the routine determines that the computer system in question has a normal functioning changeline (step 520). In making this determination, the present invention makes an assumption that a machine using the inverted logic for the changeline cannot have a broken changeline. This assumption is necessary because if the computer system in question employed the inverted logic for the changeline, and the changeline was also broken, the broken inverted logic changeline would appear identical to the normal changeline active state. As the number of machines employing the inverted logic for the changeline is small relative to those that employ the normal logic, the assumption does not impose a significant limitation upon the performance of the present invention. Having identified the changeline as being functional and employing the normal logic, the routine then inverts the Floppy Disk Not Present Value and stores the inverted value as a Floppy Disk Present Value (step 530). These stored Floppy Disk Present and Floppy Disk Not Present Values respectively identify the inactive and active state values for the changeline. As will be explained below, the Floppy Disk Present Value is later used in the Check Changeline Patch Routine of FIG. 3B. After storing the Floppy Disk Present Value, the routine sets the Changeline Valid Flag and the Changeline Determined Flag (steps 540 and 545). Also, as the present invention has determined the logic and functionality, of the changeline, the routine modifies the Check Changeline Routine to become the Check Changeline Patch Routine (step 547). The Determine Status of Media Routine will invoke the Check Changeline Patch Routine in place of the original Check Changeline Routine on all future attempts to determine the status of the media in the drive. Additionally, the routine modifies the Floppy Check Patch Routine so that when the Floppy Check Patch Routine is called in the future, the routine merely exits without performing the substantive tests described above (step 550). These modifications are optimizations which reduce processing overhead. The Check Changeline Patch Routine greatly reduces processing overhead by quickly discerning whether a functional changeline is in its active or inactive state. More specifically, by reading the changeline and combining the read changeline value with the Disk Present Value via an EXCLUSIVE OR operation, the routine expeditiously returns the state of the changeline as a normal logic value (steps 392 and 394). That is, the routine returns normal logic active/inactive values regardless of the logic actually employed by the changeline. By operating in this fashion, the routine greatly simplifies the coding of the Determine Status of Media Routine (e.g., routine does not have to make separate tests based on the logic employed by the particular changeline). Moreover, as the present invention only relies on changeline after its logic and functionality, have been determined, the present invention avoids the previously described prolonged time-outs which occur when conventional systems incorrectly assume the logic of the changeline or rely on a broken changeline. The optimization of modifying the Floppy Check Patch Routine (step 550) will be explained in more detail below with reference to a determination of a broken changeline.

After the driver 170 modifies the exit path of the Floppy Patch Routine, the present invention returns, in this instance, to the Time Out-Disk Not in Drive Routine of FIG. 4. Subsequently, the Time Out-Disk Not in Drive Routine returns a disk not present indicator to the Check Changeline Routine of FIG. 3A which, in turn, returns to the Determine Status of Media Routine of FIG. 2. Once the Determine Status of Media Routine has processing control, the routine recognizes that the present invention has determined that a disk is not present in the drive: consequently, the routine's processing steps are complete (step 220). Having described an example of how the device driver determines that a changeline is functional and employs the normal logic, examples of how the device driver determines that a changeline is not functional and how the device driver determines that a changeline employs the inverted logic will now be described with reference to the Interrupt-Disk in Drive Routine of FIG. 6.

Figure 6:
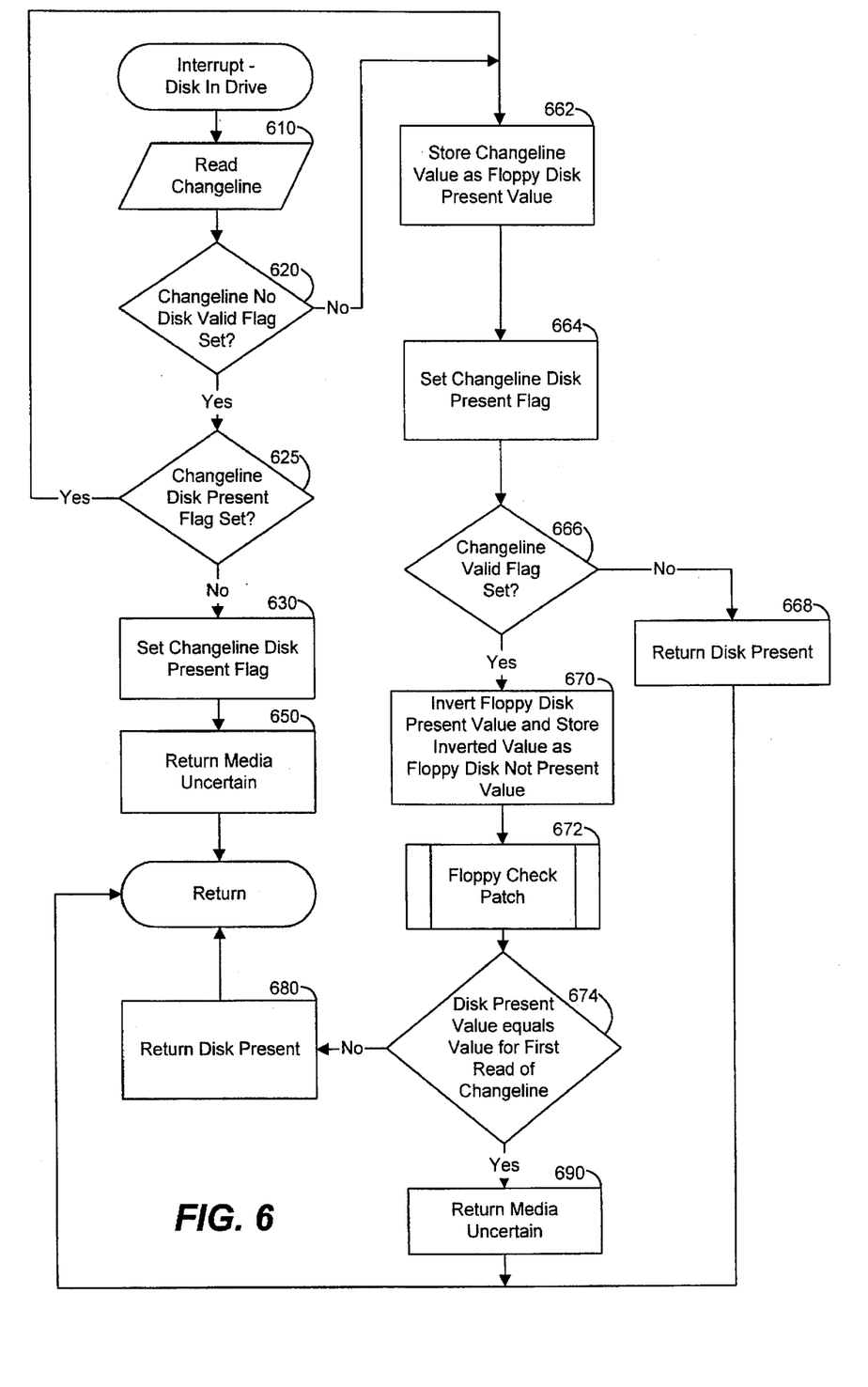
FIG. 6 is a flow diagram of the processing steps of the preferred embodiment of the present invention for determining the logic and functionality of a changeline when a disk is present in the drive.

A purpose of the Interrupt-Disk in Drive Routine is to determine the logic employed for the changeline when the Check Changeline Routine has previously determined that the changeline is valid. Also, even when the routine does not possess enough information to determine the changeline's logic, the routine returns a disk present indicator or a media uncertain indicator to the Check Changeline Routine. The media uncertain indicator is used to identify the case where the file system may not have accessed the media that is in the drive (e.g., the case where the user has opened the disk drive door since the last disk access). The routine begins processing by reading the changeline value (step 610). Subsequently, the routine determines whether the Changeline No Disk Valid Flag is set (step 620, see also step 430-Setting of Changeline No Disk Valid Flag).

At this stage of the processing, when the Changeline No Disk Valid Flag is set, the present invention knows that the changeline must either be broken or employ the inverted logic. This is necessarily the case as when the present invention recognizes that the Floppy Disk Not Present Value is equal to that of a normal logic machine, the previously described Floppy Check Patch Routine identifies the changeline as functional and modifies the Check Changeline Routine so that entry into the Interrupt Disk in Drive Routine is not possible (see steps 510–547). In order for the present invention to follow the YES Pathway of decision block 620, the user must have either (1) launched the previously-described graphical user interface program when media was not present in the drive or (2) attempted to access the drive when media was not present in the drive. Under either of these conditions, the present invention will set the Changeline No Disk Valid Flag (see step 430). Subsequently, when the user later accesses the disk drive when media is present in the drive, the present invention will invoke the Interrupt-Disk in Drive Routine (see steps 370–385). Under these circumstances, the present invention distinguishes between an inverted changeline and a broken changeline by attempting to reset the changeline on the first access to the media (steps 625–650, step 230). More specifically, the present invention determines whether this is the first access to the media by testing the state of the Changeline Disk Present Flag (step 625). This flag will be clear only for the first entrance into the Interrupt-Disk in Drive Routine (steps 630 and 664). After setting the Changeline Disk Present Flag, the present invention returns the media uncertain indicator to the Check Changeline Routine (steps 630 and 650). Consequently, the present invention attempts to reset the changeline (step 230). When the changeline is inverted as opposed to broken, this attempt will be successful and the present invention will reset the changeline from an active state to an inactive state (step 230). After attempting to reset the changeline, the present invention again invokes the Check Changeline Routine (step 240). For the case where the changeline is functional and inverted, this second invocation of the routine recognizes that the changeline has toggled states since the first reading (step 350). Consequently, the present invention will set the Changeline Valid Flag in the previously described manner (steps 360 and 370). In contrast, when the changeline is broken, the second invocation of the Check Changeline Routine will discern no change in the state of the changeline (step 350). Consequently, the routine will access the Interrupt-Disk in Drive Routine without first setting the Changeline Valid Flag (steps 350–385).

When the Interrupt-Disk in Drive Routine is accessed for the second time, the present invention determines that this is not the first access to the floppy disk by evaluating the Floppy Disk Present Flag (step 625). Consequently, the routine stores the read changeline value as a Floppy Disk Present Value (step 662). The routine also sets the Changeline Disk Present Flag to indicate that the routine has taken a valid changeline reading for the case where a disk is in the drive (step 664). In this instance, the present invention sets the Changeline Disk Present Flag for the case where the NO Pathway of decision block 620 was followed. When the present invention has not yet determined that the changeline is functional, the routine returns a disk present indicator to the Check Changeline Routine (steps 666 and 668). More specifically, the routine simply returns the disk present indicator when the present invention has neither seen two different states of the changeline nor identified Floppy Disk Not Present Value as that of an active state of a normal logic changeline. Subsequently, the Check Changeline Routine returns to the Determine Status of Media Routine of FIG. 2.

Consequently, Determine Status of Media Routine informs the file system that a disk is present in the drive. However, at this point, since the changeline's functionality has not yet been determined, this disk present indicator does not inform the file system of whether the media has changed since the last disk access. On future accesses to the floppy disk, the Determine Status of Media Routine will continue to invoke the Check Changeline Routine in order to discern the logic and functionality, of the changeline.

Conversely, when the present invention has determined that the changeline is functional, the Interrupt-Disk in Drive Routine inverts the Floppy Disk Present Value and stores the inverted value as a Floppy Disk Not Present Value (steps 666 and 670). In this case, the present invention has determined that the changeline is functional and therefore knows that it can rely on inverting the Floppy Disk Present Value to obtain an accurate Floppy Disk Not Present Value. As will be explained below, the present invention uses the Floppy Disk Present Value and the Floppy Disk Not Present Value to determine whether the changeline is normal or inverted, the present invention makes this determination by calling the Floppy Check Patch Routine of FIG. 5 (step 672).

Figure 5:
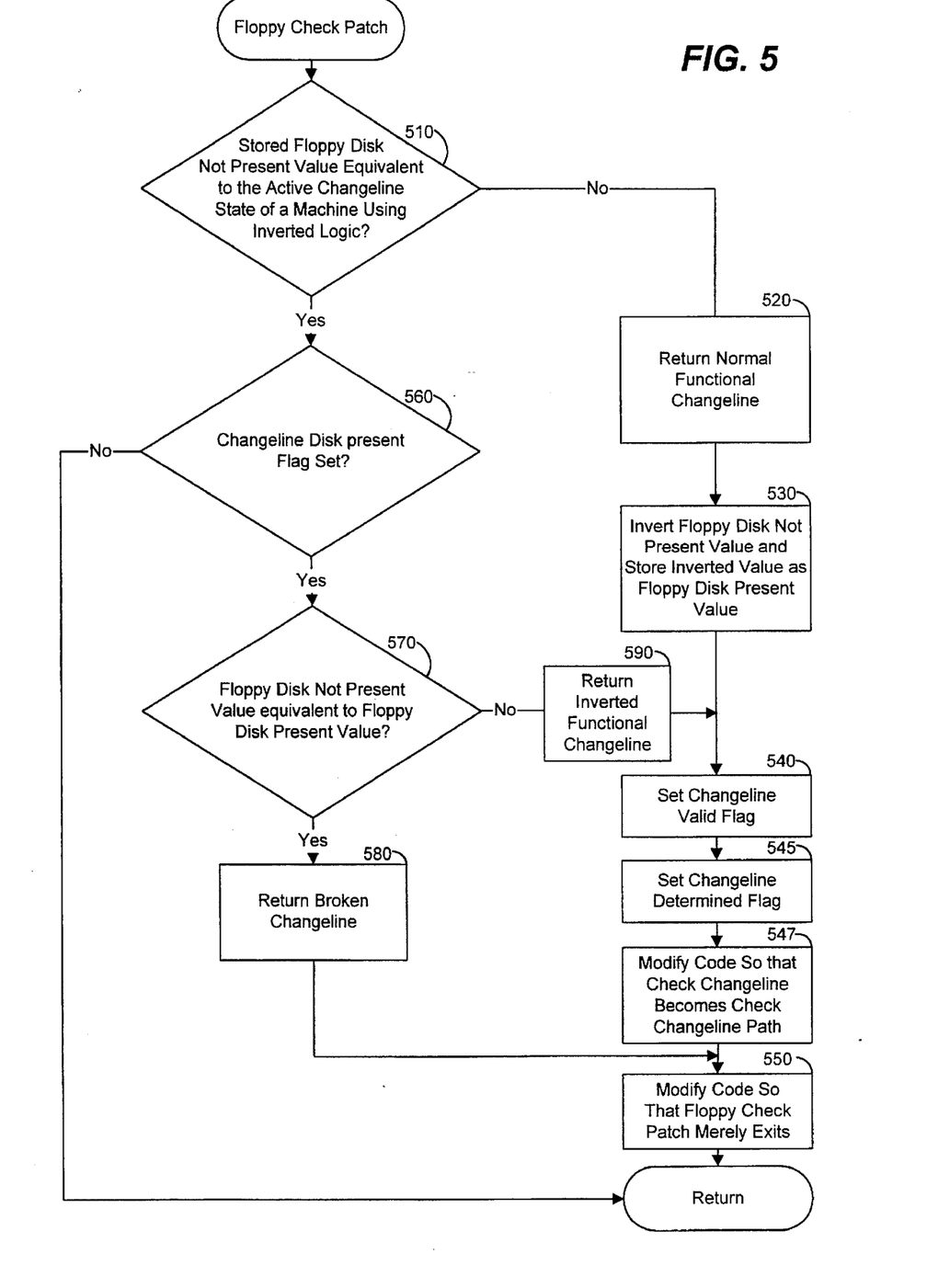
FIG. 5 is a flow diagram of the processing steps of the preferred embodiment of the present invention for determining whether the changeline uses normal logic or inverted logic or whether the changeline is broken.

As previously described, a purpose of the Floppy Check Patch Routine is to determine whether the changeline is broken or, if the changeline is not broken, to determine the logic employed by the changeline. The routine begins by determining whether the stored Floppy Disk Not Present Value is equivalent to the active changeline state of a machine using the inverted logic (step 510). For purposes of example, assume that the stored Floppy Disk Not Present Value is equivalent to the active changeline state of a machine using the inverted logic. This assumption is true for either (1) a properly functioning changeline on a machine that uses the inverted logic, or (2) an inoperable changeline on a machine using the normal logic (see Table 1). Under this assumption, the routine next determines whether the Changeline Disk Present Flag is set (step 560). In this case, the driver 170 has previously set the Changeline Disk Present Flag (steps 630 and 664). Consequently, the driver possesses sufficient information to distinguish between a broken changeline and a properly functioning inverted logic changeline. The Floppy Check Patch Routine distinguishes between these two cases by comparing the Floppy Disk Not Present Value with the Floppy Disk Present Value (step 570). When these values are logically distinct, as is the case whenever Floppy Check Patch is called from the Interrupt-Disk in Drive Routine, the present invention determines that the machine has a functional changeline which uses the inverted logic (step 590). In contrast, when the Floppy Check Patch Routine is called from the Time Out-Disk in Drive Routine under circumstances where (1) the present invention has set the Disk Present Flag in the Interrupt-Disk in Drive Routine, and (2) the Floppy Disk Present Value equals the Floppy Disk Not Present Value, the driver determines that the changeline is broken (step 580). After determining the logic of the changeline or that the changeline is broken, the routine modifies the Floppy Check Patch Routine so that it exits without performing the substantive steps discussed above (i.e., steps 510–550). This modification is an optimization added for the case where the present invention has determined that the changeline is not functional. In this case, the present invention will continue to inform the file system of the media status using the original Check Changeline Routine (as opposed to the Check Changeline Patch Routine). Consequently, the present invention calls the Time-Out Disk Not in Drive and Interrupt-Disk in Drive Routines to discern the status of the media. However, as the present invention has already determined that the changeline is not functional, there is no need to waste processing time by invoking the Floppy Check Patch Routine. Additionally, by modifying the Floppy Check Patch Routine in this manner, the present invention increases the amount of memory available to the computer system. Having determined whether the changeline is broken or inverted, the Floppy Check Patch Routine returns to the Interrupt-Disk in Drive Routine.

The Interrupt-Disk in Drive Routine continues processing by comparing the Floppy Disk Present Value with the value for the first read of the changeline (step 674). When the Floppy Disk Present Value differs from the value for the first read of the changeline, the Interrupt-Disk in Drive Routine returns a disk present indicator to the Determine Status of Media Routine (step 680). On the other hand, when the Disk Present Value is equivalent to the first read of the changeline, the Interrupt-Disk in Drive Routine returns media uncertain to indicate that a condition of media uncertainty exists (step 690). For example, in the case where the user (1) accesses a disk prior to launching the graphical user interface program with the disk still in the drive (e.g., by accessing the disk in MS-DOS® prior to launching Windows®), (2) launches the graphical user interface program with the disk still in the drive, and (3) subsequently removes and reinserts a disk to and from the drive before attempting to access the drive, the present invention will indicate that a condition of media uncertainty, exists. Under these circumstances, the access of the disk prior to launching the graphical user interface program places a functional changeline in the inactive state. Therefore, on entry, to the Check Changeline Routine immediately following the launching of the graphical user interface program, the changeline is in the inactive state (step 310). Subsequently, because the changeline is initially inactive, the changeline does not change state when the present invention attempts to reset the changeline (steps 215 and 217). As explained above, after the Check Changeline Routine determines that it has not seen a change in state, the routine accesses the Interrupt-Disk in Drive Routine as media is present in the drive (steps 350-385). When in this routine, the present invention stores the inactive changeline value as the Floppy Disk Present Value (step 662). However, as the present invention has not yet seen the changeline toggle states, the routine simply returns a disk present indicator to the Determine Status of Media Routine (steps 666 and 668). Later, when the user opens the drive door (e.g., to exchange media) the floppy disk controller will set the changeline in the active state. Consequently, when the user attempts to access the newly inserted media, the Determine Status of Media Routine will again be invoked. On this invocation, the Check Changeline Routine identifies that the active changeline state differs from the initially read inactive state, and sets the Changeline Valid Flag to indicate that the changeline is functional (steps 350 and 360). Again, as media is present in the drive, the present invention invokes the Interrupt-Disk in Drive Routine (steps 380 and 385). On this invocation of the Interrupt-Disk in Drive Routine, the present invention knows that the changeline is functional and therefore inverts the previously stored Floppy Disk Present Value to form a Floppy Disk Present value (steps 666 and 670). As explained above, the Floppy Check Patch Routine uses these values to determine the logic of the changeline (steps 510 and 570). On regaining processing control from the Floppy Check Patch Routine, the Interrupt-Disk in Drive Routine evaluates whether the Disk Present Value equals the value of the first reading of the changeline (step 674). In this case, the first read value of the changeline was an inactive value due to the disk access which occurred prior to the launching of the graphical user interface. Consequently, the first read value (i.e., an inactive changeline value) equals the Disk Present Value and the routine returns a media uncertain indicator to the Determine Status of Media Routine (step 690). In light of this media uncertain indicator, the present invention attempts to reset the changeline and recalls the Check Changeline Routine (steps 230 and 240). More specifically, the present invention calls the modified Check Changeline Patch Routine as the present invention has determined that the changeline is valid and functional. The Check Changeline Patch routine then reads the changeline, and converts the value to that of a normal disk present indicator (i.e., the normal inactive value) (steps 392 and 394). Consequently, the present invention, upon receiving this disk present indicator, informs the file system that a disk is present in the drive, but that the media has changed (steps 250 and 270).

In contrast to the above-described case where the Disk Present Value equals the value for the first read of the changeline, the present invention returns a disk present indicator when the Disk Present Value differs from the first read of the changeline (steps 674 and 680). In this case, the initial changeline reading would necessarily be the active state as the Disk Present Value is, for a functioning changeline, the inactive state. Thus, under these circumstances, the present invention has, at some time after the first reading, reset the changeline (i.e., step 217). Under these circumstances, the user did not place the changeline back in the active state (i.e., by opening the disk drive door) after the present invention reset the changeline (e.g., via step 310). Consequently, the file system can rely on using the data contained within the disk cache. For this reason, the present invention returns the disk present indicator to the Check Changeline Routine. In turn, the Check Changeline Routine forwards the disk present indicator to the Determine Status Return which in turn forwards the indicator to the file system (step 220). In the above-described manner, the present invention quickly and reliably determines the media status of the disk drive. Additionally, as the present invention does not rely on the changeline unless its logic and functionality, have been proven, the present invention does not force the user to endure lenghty time-out failures.

It will be appreciated that although the preferred embodiment of the present invention has been described herein for purposes of illustration, modifications may be made to the preferred embodiment without departing from the spirit and the scope of the invention. For example, while the preferred embodiment has been described with reference to a floppy disk changeline, those skilled in the art will appreciate that the inventive concepts disclosed within are equally applicable to any removable computer system component which uses a changeline to indicate that the component may have been removed from the computer. Additionally, the preferred embodiment is described as comparing the stored Floppy Disk Not Present Value to the active changeline state of a machine using an inverted logic. Again, those skilled in the art will appreciate that this step could also be accomplished by comparing the stored Floppy Disk Not Present Value to the active changeline state of a machine using normal logic and by reversing the accompanying YES/NO Pathways. Accordingly, the invention is not limited except as by the appended claims.

I claim:

1. In a computer system having a floppy disk drive with a floppy disk drive door, a floppy disk controller for controlling the floppy disk drive and for providing a changeline having an active state and an inactive state, wherein the active state indicates that the floppy disk drive door has been opened and the inactive state indicates that the floppy disk drive door has not been opened, a method for determining a logic of the changeline, the method comprising the steps of:

programming the floppy disk controller to reset the changeline;

after programming the floppy disk controller to reset the changeline, programming the floppy disk controller to access the floppy disk drive in order to determine whether a disk is in the floppy disk drive;

when it is determined that the disk is in the floppy disk drive, reading a first value of the changeline, and identifying the first value as a disk present value;

when it is determined that the disk is not in the floppy disk drive, reading a second value of the changeline, and identifying the second value as a disk not present value;

determining whether the disk not present reading is equivalent to an active state of a machine using an inverted logic;

when the disk not present reading is equivalent to the active state of the machine using the inverted logic, comparing the disk present reading with the disk not present reading, determining that the changeline is functional and that it employs the inverted logic when the disk present reading differs from the disk not present reading, and determining that the changeline is not functional when the disk present reading is equivalent to the disk not present reading; and when the disk not present reading is not equivalent to the active state of a machine using the inverted logic, determining that the changeline is functional and that it employs the non-inverted logic.

2. The method of claim 1 wherein the computer system further comprises a memory, area and a device driver contained within the memory, area, the method further comprising the steps of:

using the device driver to perform the step of programming the floppy disk controller, and wherein the step of programming the floppy disk controller to access the floppy disk in order to determine whether the disk is in the floppy disk drive comprises the substeps of;

specifying a predetermined amount of time;

prescribing the floppy disk controller to return to the driver when the controller cannot locate media inside the drive within the specified amount of time; and when the controller cannot locate media within the specified amount of time, determining that the disk is not in the drive.

3. In a computer system having a removable component, and an indicator having an active value for indicating that the removable component may have been removed from the computer system, and having an inactive value for indicating that the removable component has not been removed from the computer system, a method for determining whether the indicator utilizes a first or a second logic, the method comprising the steps of:

determining whether the removable component is present in the computer system;

while the removable component is not present, reading a first value for the indicator;

determining that the indicator utilizes the first logic when the first value is equal to an active value of the first logic;

while the removable component is present, reading a second value for the indicator; and determining that the indicator utilizes the second logic, when the first value differs from the second value and from the active value of the first logic.

4. In a computer system having a drive with a changeline for indicating a condition of media uncertainty, the changeline having an active state for indicating that the condition of media uncertainty exists, and an inactive state for indicating that the condition of media uncertainty, does not exit, a method for determining whether the changeline utilizes a first or a second logic, the method comprising the steps of:

determining whether a data storage medium is present in the drive;

after determining that the data storage medium is not present in the drive, reading a first value of the changeline;

determining whether the first read value is equal to an active state of the first logic; and when the first read value is equivalent to the active state of the first logic, determining that the changeline utilizes the first logic.

5. The method of claim 4 wherein the computer system further comprises a memory area and a drive controller for processing data transfer requests between the memory area and the drive, and wherein the step of determining whether the data storage medium is present in the drive comprises the steps of:

designating a predetermined amount of time;

issuing a disk access request to the drive controller;

determining when the predetermined amount of time has elapsed;

determining whether the drive controller completed the processing of the disk access request before the predetermined amount of time elapsed;

when the drive controller did not complete the processing of the disk access request before the predetermined amount of time elapsed, determining that the data storage medium is not present in the drive; and when the drive controller did complete the processing of the disk access request before the predetermined amount of time elapsed, determining that the data storage medium is present in the drive.

6. The method of claim 4, further comprising the steps of:

after determining that the data storage medium is present in the drive, reading a second value of the changeline;

comparing the first read value to the second read value; and when the first read value differs from the second read value and from the active state of the first logic, determining that the changeline utilizes the second logic for the changeline.

7. The method of claim 6, further comprising the step of:

attempting to place the changeline in the inactive state prior to reading the second value.

8. In a computer system having a disk drive with a disk changeline, a method for determining whether the disk changeline utilizes a first or a second logic, the method comprising the steps of:

determining when a disk is present in the disk drive;

reading a first value for the disk changeline when the disk is present in the disk drive;

determining when a disk is not present in the disk drive;

reading a second value for the disk changeline when the disk is not present in the disk drive;

determining whether the first read value is equal to the second read value;

determining whether the second read value is equal to an active state of a reference changeline for a machine which employs the second logic; and when the second read value is equivalent to the active state of the reference changeline for the machine that employs the second logic, and when the first read value is not equivalent to the second read value, determining that the disk changeline utilizes the second logic.

9. The method of claim 8 wherein the method further determines whether the changeline is functional, the method further comprising the step of:

determining that the changeline is not functional when the first read value is equivalent to the second read value.

10. The method of claim 8, the method further comprising the step of:

when the second read value is not equivalent to the active state of the reference changeline for the machine that employs the second logic, determining that the computer system employs the first logic for the changeline.

11. In a computer system operating in a mode wherein floppy disks are not required to be inserted into a floppy disk drive in a predetermined sequence, a method for determining whether a floppy disk changeline is functional, the method comprising the steps of:

monitoring the floppy disk changeline until it changes from a first state to a second state;

wherein the step of monitoring, the floppy disk changeline includes taking a first reading of the floppy disk changeline, resetting the changeline to set the floppy disk changeline into the second state, taking a second reading of the floppy disk changeline, and comparing the first reading with the second reading to determine whether the floppy disk changeline has changed from the first state to the second state; and determining that the floppy disk drive is functional after observing the floppy disk changeline undergo a change from a first state to a second state.

12. The method of claim 11 wherein the computer system has a memory area, the method further comprising the steps of:

determining whether a floppy disk is in the drive;

when the floppy disk is in the drive, taking a third reading of the floppy disk changeline and storing the third reading in the memory area as a disk present value;

when the floppy disk is not in the floppy disk drive, taking a fourth reading of the floppy disk changeline and storing the fourth reading in the memory area as a disk not present value;

comparing the disk not present value with the disk present value; and determining that the floppy disk changeline is not functional when the disk present value is equal to the disk not present value.

13. The method of claim 11 wherein the method further determines whether the floppy disk changeline utilizes a normal logic, and wherein the computer system has a memory area, the method further comprising the steps of:

determining whether a floppy disk is in the floppy disk drive;

when the floppy disk is in the floppy disk drive, taking a third reading of the floppy disk changeline and storing the third reading in the memory area as a disk present value; and when the first reading of the floppy disk changeline differs from the second reading, inverting the disk present value, storing the inverted disk present value as a disk not present value, comparing the disk not present value with a predetermined changeline active value of a machine using an inverted logic for its changeline, and when the disk not present value is not equivalent to the predetermined changeline active value, determining that the floppy disk changeline utilizes the normal logic.

14. The method of claim 11 wherein the computer system has a memory area and wherein the method further determines whether the floppy disk changeline utilizes an inverted logic, the method further comprising the steps of:

accessing the drive to determine whether a floppy disk is in the floppy disk drive;

when the floppy disk is in the floppy disk drive, taking a third reading of the floppy disk changeline and storing the third reading in the memory, area as a disk present value;

determining a disk not present value;

comparing the disk not present value with a predetermined changeline active value of a machine using an inverted logic for its changeline; and when the disk not present value is equivalent to the predetermined changeline active value, determining that the floppy disk changeline uses the inverted logic when the disk present value is not equivalent to the disk not present value.

15. The method of claim 14 wherein the step of determining the disk not present value comprises the step of:

when the floppy disk is not in the floppy disk drive, taking a fourth reading of the floppy disk changeline and storing the fourth reading as the disk not present value.

16. The method of claim 14 wherein the step of determining the disk not present value comprises the step of:

after determining that the floppy disk changeline is functional, inverting the disk present value and storing the inverted value as the disk not present value.

17. The method of claim 14, further comprising the step of:

determining that the changeline is not functional when the disk present value is equivalent to the disk not present value.

18. In a computer system providing a floppy disk drive having a floppy disk door, a floppy disk controller for controlling the floppy disk drive and for providing a changeline that indicates when the floppy disk door has been opened, an apparatus for determining whether the computer system employs a first or a second logic for the changeline, the apparatus comprising:

a determining device to determine whether a floppy disk is present in the floppy disk drive;

a changeline reading device to take a first reading of the changeline when the determining device has determined that the floppy disk is present, and to take a second reading of the changeline when the determining device has determined that the floppy disk is not present;

a comparing device to compare the readings taken by the changeline reading device, and to determine whether the second reading of the changeline reading device is equivalent to a predetermined active value of the second logic; and a logic identifying device to determine that the computer system employs the first logic for the changeline when the comparing device determines second reading of the changeline reading device is not equivalent to the predetermined active value of the second logic.

19. The apparatus of claim 18 wherein the logic identifying device further determines that the computer system employs the second logic for the changeline when the comparing device determines that the second reading of the changeline reading device is equivalent to the predetermined active value of the second logic and when the comparing device further determines that the first changeline reading of the changeline reading device is not equivalent to the second reading of the changeline reading device.

20. The apparatus of claim 18, the apparatus further comprising:

a broken changeline identifying device to determine that the changeline is broken when the comparing device determines that the first changeline reading of the changeline reading device is equivalent to the second reading of the changeline reading device.

21. A computer-readable storage medium holding a computer program for determining logic of a changeline in a computer system having a floppy disk drive with a floppy disk drive door, a floppy disk drive controller for controlling the floppy disk drive and for providing the changeline that has an active state and an inactive state, wherein the active state indicates that the floppy disk drive door has been opened and the inactive state indicates that the floppy disk drive door has not been opened, said computer program performing the steps of:

programming the floppy disk controller to reset the changeline;

after programming the floppy disk controller to reset the changeline, programming the floppy disk controller to access the floppy disk drive in order to determine whether a disk is in the floppy disk drive;

when it is determined that the disk is in the floppy disk drive, reading a first value of the changeline, and identifying the first value as a disk present value;

when it is determined that the disk is not in the floppy disk drive, reading a second value of the changeline, and identifying the second value as a disk not present value;

determining whether the disk not present reading is equivalent to an active state of a machine using an inverted logic;

when the disk not present reading is equivalent to the active state of the machine using the inverted logic, comparing the disk present reading with the disk not present reading, determining that the changeline is functional and that it employs the inverted logic when the disk present reading differs from the disk not present reading, and determining that the changeline is not functional when the disk present reading is equivalent to the disk not present reading; and when the disk not present reading is not equivalent to the active state of a machine using the inverted logic, determining that the changeline is functional and that it employs the non-inverted logic.

* * * * *

UNITED STATES PATENT AND TRADEMARK OFFICE
CERTIFICATE OF CORRECTION

PATENT NO. : 5,625,799
DATED : April 29, 1997
INVENTOR(S) : Ron Radko

It is certified that error appears in the above-indentified patent and that said Letters Patent is hereby corrected as shown below:

In column 15, claim 2, line 2, following "memory", please delete ",".

In column 15, claim 2, line 3, following "memory", please delete ",".

In column 16, claim 4, line 5, following "uncertainty", please delete ",".

In column 18, claim 14, line 9, following "memory", delete ",".

Signed and Sealed this

Ninth Day of September, 1997

Attest:

BRUCE LEHMAN

*Attesting Officer*  *Commissioner of Patents and Trademarks*